(12) United States Patent
Toyoda

(10) Patent No.: US 10,407,575 B2
(45) Date of Patent: Sep. 10, 2019

(54) EPOXY RESIN POWDER COATING MATERIAL

(71) Applicant: SOMAR CORPORATION, Tokyo (JP)

(72) Inventor: Masaaki Toyoda, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

(21) Appl. No.: 15/698,809

(22) Filed: Sep. 8, 2017

(65) Prior Publication Data

US 2018/0079911 A1  Mar. 22, 2018

(30) Foreign Application Priority Data

Sep. 16, 2016  (JP) ................................. 2016-181220

(51) Int. Cl.
| | | |
|---|---|---|
| *C09D 163/02* | (2006.01) | |
| *C09D 5/03* | (2006.01) | |
| *C08G 59/24* | (2006.01) | |
| *C09D 163/00* | (2006.01) | |
| *C09D 7/61* | (2018.01) | |
| *C09D 7/65* | (2018.01) | |
| *C09D 7/40* | (2018.01) | |
| *C08L 51/00* | (2006.01) | |

(52) U.S. Cl.
CPC ........... *C09D 5/031* (2013.01); *C08G 59/245* (2013.01); *C08L 51/006* (2013.01); *C09D 5/032* (2013.01); *C09D 5/033* (2013.01); *C09D 7/61* (2018.01); *C09D 7/65* (2018.01); *C09D 7/68* (2018.01); *C09D 7/69* (2018.01); *C09D 163/00* (2013.01)

(58) Field of Classification Search
None
See application file for complete search history.

(56) References Cited

U.S. PATENT DOCUMENTS

| | | | | |
|---|---|---|---|---|
| 5,646,204 A | * | 7/1997 | Akiba | .................... C08G 59/38 523/443 |
| 6,861,475 B2 | * | 3/2005 | Ilenda | .................... C09D 5/037 525/65 |
| 2009/0032295 A1 | * | 2/2009 | Okajima | .............. H05K 1/0203 174/260 |
| 2013/0217804 A1 | * | 8/2013 | Campbell | .......... C08G 59/4007 523/400 |
| 2014/0378579 A1 | * | 12/2014 | Perfetti | .................. C08L 67/06 523/436 |
| 2015/0060289 A1 | * | 3/2015 | Saiki | ...................... C25D 11/16 205/50 |
| 2015/0240113 A1 | * | 8/2015 | Pratt | ...................... C09D 5/033 428/327 |
| 2016/0007453 A1 | * | 1/2016 | Kawate | ................ H05K 1/0306 361/783 |
| 2017/0275413 A1 | * | 9/2017 | Miyatake | ................ C08G 59/42 |

FOREIGN PATENT DOCUMENTS

| | | | | | |
|---|---|---|---|---|---|
| JP | 09100425 | A | * | 4/1997 | ............... C09D 5/03 |
| JP | 2000103989 | A | * | 4/2000 | ............... C09D 5/03 |

OTHER PUBLICATIONS

Machine translation of JP-2000103989-A (no date).*
Machine translation of JP-09100425-A (no date).*

* cited by examiner

Primary Examiner — Michael J Feely
(74) Attorney, Agent, or Firm — Rankin, Hill & Clark LLP

(57) ABSTRACT

An epoxy resin powder coating material is provided, by which, while workability and coating property are not deteriorated, a coating film having excellent heat cycle resistance can be formed also on recent metal parts having a configuration of intricately combining a plurality of different kinds of metals of different material qualities and required to have high-standard performance. The epoxy resin powder coating material is manufactured by blending a spherical inorganic particle and acryl-based core shell type particle having an average particle diameter of 16 to 50 μm in a bisphenol A-type epoxy resin, wherein an average particle diameter of the acryl-based core shell type particle is preferably 0.1 to 0.4 μm.

13 Claims, No Drawings

EPOXY RESIN POWDER COATING MATERIAL

BACKGROUND OF THE INVENTION

Field of the Invention

The present invention relates to an epoxy resin powder coating material suitable for forming a coating film on metal parts, such as electric/electronic products.

Description of the Related Art

Epoxy resin powder coating materials are advantageous comparing with solvent type coating materials in terms of productivity, working environment, reuse of the coating materials, etc. and have good mechanical, electric and thermal properties. Also, they are often used as a coating material for insulation coating.

Electrical passive parts (that is, metal parts) to be coated by an epoxy resin powder coating material is assumed to be exposed to drastic temperature changes depending on peripheral environmental temperature to be used and self-heating when power is supplied. This is called a heat cycle. When thermal shrinkage and thermal expansion are repeated due to the action of the heat cycle repetition, distortions accumulate on the coating film and cracks or other coating film breaks arise, which lead to insulation breakdown. Therefore, there are strong demands for an increase of heat cycle resistance.

As a method of increasing the heat cycle resistance in the related art, the method of suppressing material distortions caused by thermal expansion and shrinkage by blending an inorganic particle so as to lower a linear expansion coefficient (Patent Document 1), the method of absorbing material distortions caused by thermal expansion and shrinkage by blending a material having flexibility so as to provide flexibility to the coating film (Patent Document 2) and the method of blending two different kinds of epoxy resins, which are a bisphenol A-type epoxy resin and novolac-type functional epoxy resin, an inorganic particle and a material having flexibility, preferably silicon rubber (Patent Document 3) are known.

RELATED ART DOCUMENTS

Patent Documents

[Patent Document 1] Japanese Patent Publication (kokai) No. H06-256686
[Patent Document 2] Japanese Patent Publication (kokai) No. H10-259323
[Patent Document 3] Japanese Patent Publication (kokai) No. H10-130542

Problem of the Related Art

In recent years, along with advance of performances in various products, metal parts have come to have a configuration of intricately combining a plurality of kinds of metals of different material qualities. Also, standards of demanded performances have become higher. When applying the techniques in the patent documents 1 to 3 of the related art to those recent metal parts using a plurality of kind of metals of different material qualities, having a configuration of combining them intricately and required to exhibit high-standard performances, (hereinafter, also referred to as "recent metal parts"), they could not endure stresses caused by the heat cycle and cracks arose on the coating films, which means they had insufficient heat cycle resistance.

The actual condition is that the techniques of the related art do not satisfy the required standard for heat cycle resistance and furthermore improvements to increase the heat cycle resistance has been desired.

The present inventors improved the techniques of the related art to obtain an epoxy resin powder coating material for forming a coating film having excellent heat cycle resistance and applicable also to the recent metal parts (explained above).

The present inventors considered to improve the technique in the patent document 1 for the purpose of increasing the heat cycle resistance by furthermore increasing a blending amount of inorganic particles to furthermore lower the linear expansion coefficient, so that distortions caused by thermal expansion and shrinkage would be suppressed. However, an increase of viscosity adversely affected workability at coating and a coating property was lost, so that practicable resultant could not be obtained.

Also, the present inventors considered to improve the technique in the patent document 2 for the purpose of improving the heat cycle resistance by furthermore increasing a blending amount of a material having flexibility to give flexibility to a coating film, so that distortions caused by thermal expansion and shrinkage would be absorbed. However, it resulted in a decline of Tg of a coating film, a decline of initial heat resistance and, moreover, cracks arose on the coating film and the heat cycle resistance became poor.

Furthermore, the present inventors considered to improve the technique in the patent document 3, wherein a spherical inorganic particle and silicon rubber particle were used together, for the purpose of improving the heat cycle resistance by furthermore increasing a blending amount of the spherical inorganic particle to lower the linear expansion coefficient, so that distortions caused by thermal expansion and shrinkage would be suppressed. An epoxy resin powder coating material, wherein a bisphenol A-type epoxy resin and novolac-type functional epoxy resin were used together as the main agent and a spherical inorganic particle and silicone rubber particle are included, resulted in cracks on the coating film and exhibited poor heat cycle resistance. Therefore, they omitted the novolac-type functional epoxy resin and used only the bisphenol A-type epoxy resin as the main agent, however, cracks arose on the coating film and the heat cycle resistance could not be improved.

As explained above, the heat cycle resistance of coating films to be formed cannot be improved only by simply applying the techniques of the related art, so that those techniques could not be used for the recent metal parts.

BRIEF SUMMARY OF THE INVENTION

The present invention has an object thereof to provide an epoxy resin powder coating material capable of forming a coating film having excellent heat cycle resistance also on the recent metal parts (explained above) while maintaining workability at coating or a coating property.

The present inventors found that the object explained above can be attained by blending a spherical inorganic particle having an average particle diameter of 16 to 50 μm and an acryl-based core shell type particle in a bisphenol A-type epoxy resin and completed the present invention.

Namely, the epoxy resin powder coating material of the present invention comprises as essential components (A) a bisphenol A-type epoxy resin, (B) spherical inorganic particle having an average particle diameter of 16 to 50 µm and (C) acryl-based core shell type particle.

The epoxy resin powder coating material may include the modes below.

It is preferable that an average particle diameter of (C) is 0.1 to 0.4 µm.

A ratio of an average particle diameter of (C) to an average particle diameter of (B) (acryl-based core shell type particle/spherical inorganic particle) is preferably 0.002 to 0.025.

It is preferable that (C) includes an acryl-based core shell type rubber particle.

It is preferable that (C) includes an acryl-based core shell type rubber particle comprising a glycidyl group at its outermost layer.

A blending amount of (B) is preferably 180 to 250 parts by weight with respect to 100 parts by weight of component (A).

A blending amount of (C) is preferably 3 to 25 parts by weight with respect to 100 parts by weight of component (A).

The epoxy resin powder coating material of the present invention comprises a bisphenol A-type epoxy resin, spherical inorganic particle having a specific average particle diameter range, and an acryl-based core shell type particle as essential components. Thereby, a coating film having excellent heat cycle resistance can be formed even on the recent metal parts (metal parts having the configuration of intricately combining a plurality of kinds of metals of different material qualities and required to exhibit high-standard performances) without deteriorating workability at coating or a coating property.

DETAILED DESCRIPTION OF THE INVENTION

Below, the best mode of the present invention will be explained, however, the present invention is not limited to the modes explained below, and arbitrarily changed or improved modes based on the normal knowledge of persons skilled in the art within a scope of the present invention are also included in the present invention.

The epoxy resin powder coating material of the present invention comprises as essential components (A) a bisphenol A-type epoxy resin, (B) a spherical inorganic particle and (C) an acryl-based core shell type particle.

Below, the powder coating material of the present invention will be explained in detail.

<(A)>

In the present invention, a bisphenol A-type epoxy resin is used as component (A) in terms of the heat cycle resistance, electric property and mechanical property of a cured product (coating film). The bisphenol A-type epoxy resin to be used preferably has a molecular weight of 1000 to 1500. It is because when using a bisphenol A-type epoxy resin having a molecular weight in this range, dripping at coating can be suppressed and smooth coating films can be obtained easily. Only one kind of the epoxy resin may be used, or two or more kinds having different molecular weights may be combined for use so that the molecular weight becomes in a range of 1000 to 1500.

<(B)>

In the present invention, a spherical inorganic particle is used as the component (B). As the spherical inorganic particle, those conventionally known may be used arbitrarily in accordance with the use purposes. For example, silica, alumina, zirconia, titania, magnesia, ceria, yttria, zinc oxide, iron oxide, barium titanate, alumina-silica composite oxide and other oxides; silicon nitride, titanium nitride, boron nitride, aluminum nitride and other nitrides; calcium fluoride, barium fluoride, barium sulfate and other sparingly soluble ion crystals; silicon, diamond and other covalently bonded crystals; silicon carbide, calcium carbonate, aluminum sulfate, aluminum hydroxide, potassium titanate, talc, kaolin clay, kaolinite, halloysite, pyrophylite, montmorillonite, sericite, mica, amesite, bentonite, asbestos, zeolite, calcium silicate, magnesium silicate, boehmite, apatite, mullite, spinel, olivine, etc. or compounds including them, etc. may be mentioned. Those spherical inorganic particles may be used alone or in combination of two or more kinds having different compositions.

In the present invention, in terms of increasing the heat cycle resistance of a coating film to be formed, those having a low linear expansion coefficient in a range of −50° C. to 250° C., for example, those with $1 \times 10^{-6}$(/° C.) or lower among those various spherical inorganic particles are preferably blended in an amount of at least 80 wt % in the component (B).

An average particle diameter (d1) of the spherical inorganic particle to be used as the component (B) has to be 16 to 50 µm. It is because when d1 is 16 µm or larger, a flow and leveling property of the coating material becomes preferable at coating and a coating property improves. On the other hand, when d1 is 50 µm or smaller, a surface of a coating film to be formed does not become uneven and a coating film having a uniform film thickness can be formed. In terms of improving the coating property and furthermore improving uniformity of the film thickness, a spherical inorganic particle having d1 of 20 to 40 µm is more preferably used.

In the present invention, as the component (B), only one kind of a spherical inorganic particle having an average particle diameter of 16 to 50 µm may be used or two or more kinds having different particle diameters may be combined to use so that an average particle diameter of the blended inorganic particles as a whole becomes in the range of 16 to 50 µm.

An average particle diameter of the spherical inorganic particle is a 50% particle diameter (D50 value) in the number-based cumulative distribution measured, for example, by using a laser diffraction-type particle size distribution measurement apparatus.

As market-available products usable as the component (B), for example, S140 (made by Micron Company, average particle diameter: 25 µm), SC30 (made by Micron Company, average particle diameter: 30 µm) and FB-74 (made by Denka Company Limited, average particle diameter: 30 µm), etc. may be mentioned.

A blending amount of the component (B) is preferably 180 to 250 parts by weight with respect to 100 parts by weight of component (A). It is because when the blending amount of the component (B) is 180 parts by weight or more, the heat cycle resistance of a coating film to be formed tends to become preferable. On the other hand, when the blending amount of the component (B) is 250 parts by weight or less, the coating property is expected to be preferable. In terms of increasing the heat cycle resistance of the coating film and improving coating property of a coating film, the blending amount of the component (B) is more preferably 200 to 230 parts by weight with respect to 100 parts by weight of the component (A).

<(C)>

In the present invention, in terms of mechanical property and thermal shock alleviating property of a cured product (coating film) and compatibility with an epoxy resin, an acryl-based core shell type particle is used as the component (C). The acryl-based core shell type particle is an acryl-based polymer particle composed of an inner layer (core) to be a core and one or more outer layers (shell) covering the core and having a two-layer configuration (core/shell), wherein the core and shell are formed by polymers having different characteristics. The number of layers composing the core and that composing the shell are not particularly limited and they may be composed of only one layer or two or more layers. The respective compositions of the core and shell are not particularly limited.

Preferably, an average particle diameter (d2) of an acryl-based core shell type particle to be used as the component (C) is 0.1 to 0.4 µm. It is because when using a core shell type particle having d2 in this range, a coating film having a uniform film thickness can be formed.

An average particle diameter of a core shell type particle may be measured, for example, based on a picture taken through a microscope. To explain specifically, it is an average value (number average particle size) of particle diameters (outer diameter) of 100 core shell type particles. When the shape is not a perfect circle shape, that is, an oval shape in the picture above, an outer diameter of the particle in the longitudinal direction may be considered as a particle diameter thereof. A scanning type electron microscope or transmission type electron microscope may be used as the microscope.

In the present invention, as the component (C), only one kind of core shell type particle having an average particle diameter in a range of 0.1 to 0.4 µm may be used or two or more kinds having different particle diameters may be combined so that an average particle diameter of the blended core shell type particles as a whole becomes 0.1 to 0.44 µm.

In the present invention, by combining component (B) having a large average particle diameter (d1: 16 to 50 µm) and component (C) having a small average particle diameter (d2: 0.1 to 0.4 µm), furthermore excellent heat cycle resistance can be provided to a cured product (coating film). It is considered that when combined as above, it is particularly effective for suppressing thermal expansion and an ability for following to motions responsive to expansion and shrinkage during the heat cycle because they are dispersed with balance in an epoxy resin, which is the component (A).

In the present invention, a ratio (d2/d1) of an average particle diameter (d2) of the component (C) to an average particle diameter (d1) of the component (B) is preferably (0.002) to (0.025), more preferably (0.007) to (0.014) and furthermore preferably (0.009) to (0.011). When (d2/d1) is in a preferable range, furthermore improvement of the effect of the present invention can be expected.

A blending amount of the component (C) is preferably 3 to 25 parts by weight with respect to 100 parts by weight of the component (A) and more preferably 3 to 20 parts by weight. It is because when a blending amount of the component (C) is 3 parts by weight or more, heat cycle resistance of a coating film to be formed tends to become preferable. On the other hand, when the blending amount of the component (C) is 20 parts by weight or less, a coating property is expected to be more preferable.

In the present invention, in terms of providing toughness, it is preferable to use an acryl-based core shell type rubber particle composed of a rubbery polymer core and vitreous polymer shell as the component (C).

The rubber particle has "elasticity" (rubber elasticity) at the cores and "hardness" at the shells and does not dissolve in a powder coating material. A polymer forming the "core" has a glass transition temperature (Tg) of substantially at the ambient temperature or lower. A polymer forming the "shell" has a Tg of substantially at the ambient temperature or higher. The ambient temperature is determined as a temperature range in which a powder coating material is produced, kept or used.

A core particle composing the acryl-based core shell type rubber particle is formed by a core-use polymer obtained by polymerizing a core-use monomer component. As the core-use monomer component for synthesizing the core-use polymer, for example, n-propyl (meth)acrylate, n-butyl (meth)acrylate, 2-ethylhexyl (meth)acrylate, n-decyl (meth)acrylate and other (meth)acrylate-based monomers; styrene, vinyl toluene, ca-methyl styrene and other aromatic vinyl-based compounds; acrylonitrile, methacrylonitrile and other vinyl cyanide compounds; vinylidene cyanide, 2-hydroxyethyl (meth)acrylate, 3-hydroxybutyl (meth)acrylate, 2-hydroxyethyl fumarate, hydroxybutylvinylether, monobutyl maleate, butoxyethyl methacrylate, etc. may be mentioned. Furthermore, ethylene glycol di(meth)acrylate, butylene glycol di(meth)acrylate, trimethylol propane di(meth)acrylate, trimethylol propane tri(meth)acrylate, hexanediol di(meth)acrylate, hexanediol tri(meth)acrylate, oligoethylene di(meth)acrylate, oligoethylene tri(meth)acrylate and other crosslinkable monomers having two or more reactive groups; divinylbenzene and other aromatic divinyl monomers; trimellitic acid triaillyl and triallyl isocyanate, etc. may be mentioned. One or different two or more kinds may be selected from those to use.

The core-use polymer is preferably a crosslinkable polymer. Therefore, preferably a crosslinkable monomer is included in the core-use monomer components (for example, 1 to 30 wt % or so with respect to 100 wt % of core-use monomer components). When the core particle is crosslinkable, intrusion by a shell-use monomer component to the core particle is suppressed at the time of adding a shell-use monomer component, consequently, it is liable that particles having a core shell structure, wherein a shell polymer covers a surface of the core particle more uniformly, can be obtained.

A rubbery property changes depending on a molecular weight, molecular shape and crosslinking density of a core-use polymer. In the present invention, the core part is preferably a rubbery polymer at room temperature (25° C.). More preferably, the core-use polymer to be obtained comes to have a Tg of −10° C. or lower.

The shell composing an acryl-based core shell type rubber particle covering the outer surface of the core particle is formed by a shell-use polymer obtained by polymerizing a shell-use monomer component. As the shell-use monomer component for synthesizing the shell-use polymer, those mentioned above as the core-use monomer components may be used. Preferably, ethyl (meth)acrylate, n-butyl acrylate, methyl methacrylate, butyl methacrylate and other (meth)acrylates, wherein the number of carbons in an alkyl group is 1 to 4, may be mentioned. Those may be used alone or in combination of two or more kinds. Particularly, methyl methacrylate is preferable among them.

In the present invention, the shell is preferably a vitreous polymer at normal temperature (25° C.) and, moreover, a Tg of the shell-use polymer is preferably 70° C. or higher. This may be determined depending on a molecular weight, molecular shape and crosslinking density, etc. of the shell-use polymer.

In the present invention, to provide remarkable heat cycle resistance, it is more preferable to use as component (C) those including a glysidyl group in an outermost layer of the acryl-based core shell type rubber particle. The acryl-based core shell type rubber particle including a glycidyl group in the outermost layer is not particularly limited and a polymer of a glycidyl group-containing vinyl-based unit may be mentioned as a glycidyl group-containing compound included in the outermost layer. As specific examples of the glycidyl group-containing vinyl-based units, glycidyl (meth) acrylate, glycidyl itaconate, diglycidyl itaconate, arylglycidyl ether, styrene-4-glycidyl ether and 4-glycidyl styrene, etc. may be mentioned. In terms of providing remarkable heat cycle resistance, glycidyl (meth)acrylate is most preferably used. Those units may be used alone, or two or more kinds may be used.

Other than the glycidyl group-containing vinyl-based unit polymers above, the shell including the outermost layer may also include a polymer comprising at least one kind of unit selected from unsaturated carboxylic acid alkyl ester-based unit, unsaturated dicarboxylic acid anthdride-based unit, aliphatic vinyl-based unit, aromatic vinyl-based unit, vinyl cyanide-based unit, maleimide-based unit, unsaturated dicarboxylic acid-based unit and other vinyl-based units, etc. Among them, it is preferable to include a polymer comprising at least one kind of unit selected from unsaturated carboxylic acid alkyl ester-based unit and unsaturated dicarboxylic anhydride-based unit.

As preferable examples of acryl-based core shell type rubber particle comprising a glycidyl group at its outermost layer, those having a core particle formed with a butyl acrylate polymer and an outermost layer of the shell formed with methyl methacrylate or methyl methacrylate/glycidyl methacrylate copolymer; and those having core particle formed with a dimethylsiloxane/butyl acrylate copolymer and an outermost layer of the shell formed with methyl methacrylate or methyl methacrylate/glycidyl methacrylate copolymer, etc. may be mentioned.

In the component (C), a weight ratio of the core and shell is not particularly limited, however, the core is preferably 50 to 95 wt %, more preferably 55 to 93 wt % and particularly preferably 60 to 90 wt % with respect to the entire core shell type particle. When the core is 50 wt % or more, a cured product (coating film) can obtain sufficient effects as to a mechanical property and thermal impact alleviating property, and when 95 wt % or less, the core can be almost totally covered with a shell and sufficient compatibility with an epoxy resin and dispersibility can be secured.

As the component (C), market-available products satisfying the conditions above may be also used, or it may be manufactured by well-known methods.

As market-available products, for example, "METABLEN" made by Mitsubishi Rayon, "Kane Ace" made by KANEKA Corporation, "Paraloid" (for example, EXL2655 and EXL2314, etc.) made by Dow Chemical Company, "Staphyloid" (for example, AC3355, etc.) and "Zefiac" series (for example, F351, etc.) made by Ganz Chemical Co. Ltd. and "PARAFACE" made by Kuraray Co., Ltd., etc. may be mentioned. Those may be used alone or two or more kinds may be used together.

As a curing agent to be used for the component (A), conventionally known curing agents for epoxy resins may be used arbitrarily in accordance with the use purposes.

For example, acid anhydrides, amines, imidazols, dihydrogins, lewis acids, Bronsted acid salts, polymercaptons, isocyanates, blocked isocyanates, dicyandiamides, carboxylic acid dihydrazides, melamine resins and polycarboxylic acids, etc. may be used. Those curing agents may be used alone or two or more kinds may be used together.

Other than the components explained above, the epoxy resin powder coating material of the present invention may blended with a catalyst, curing accelerator, flowing agent, flame retardant, colorant, levelling agent, coupling agent, defoaming agent, release agent or other practically used auxiliary components as needed in a range of not hindering the effects of the present invention.

Next, a method of manufacturing the epoxy resin powder coating material of the present invention will be explained.

A powder coating material is obtained by performing melt kneading processing using a kneader, etc. or melt mixing processing using an extruder, etc. on an epoxy resin and inorganic particle, etc., then, cooling the mixture to set, roughly pulverizing, adding a curing agent and, if necessary, a catalyst, curing accelerator or other auxiliary components to the roughly pulverized resultant, performing dry mixing, performing melt mixing processing on the mixture, then, cooling the mixture to set, finely pulverizing and, then, classifying so that an average particle diameter of, for example, 30 to 80 μm can be attained.

A kind and shape of parts to be coated with the epoxy resin powder coating material of the present invention are not particularly limited, however, to bring out the full effects of the present invention, the powder coating material of the present invention is particularly preferably used for a stereostructure with non-planar portions (protruded and recessed portions) formed by combining a plurality of kinds of metals of different material qualities.

Namely, since the epoxy resin powder coating material of the present invention has preferable followability to shapes having protruded and recessed portions formed by combining a plurality of kinds of metals of different material qualities, it is also preferably used, for example, for box-shaped objects, corrugated objects, bag-shaped objects, cylindrically-shaped objects, bar-shaped objects and objects with holes, etc.

The epoxy resin powder coating material of the present invention may be used in conventionally known coating methods in accordance with the use purposes.

For example, a fluid-soaking method, electrostatic fluidized bed method, corona charging method and triboelectric charging method, etc. may be mentioned. Among them, the fluid-soaking method is preferable in the case of obtaining an insulating coating film with a sufficient film thickness.

It is preferable that no crack arise on a cured coating film formed of a cured object, which is obtained by coating the epoxy resin powder coating material of the present invention on a part to be coated and curing, when a heat cycle test of leaving the part at −40° C. for 30 minutes, then, 150° C. for 30 minutes is repeated for 80 times. When an excellent heat cycle resistance as such is provided, reliability of the cured coating film becomes high.

EXAMPLES

Below, an explanation will be made on the epoxy resin powder coating material of the present invention and a coating film obtained by applying it to a metal part and thermally curing, that is, a cured coating film by using specific examples. However, the epoxy resin powder coating material and cured coating film of the present invention are not limited to the examples. Note that powder coating materials in the examples and comparative examples were evaluated on their coating property, and cured coating films were evaluated on uniformity and heat cycle resistance.

In the examples, "%" and "part" indicate weight % and part by weight unless otherwise mentioned.

(Evaluation on Coating Property)

A horizontal fluidity explained below was measured to evaluate the coating property.

Each epoxy resin powder coating material of examples and comparative examples in an amount of 1.0 g was put in a mold for molding a pill, applied a pressure of 90 MPa for 60 seconds to mold a pill, and a diameter (A) of the pill was measured.

Then, the pill was placed on a glass slide, left for 10 minutes in a hot air drying furnace at 140'C, taken out and a diameter (B) of the pill was measured. The horizontal fluidity was calculated from the formula (1) below.

$$\text{Horizontal Fluidity} = \{[B \text{ (mm)} - A \text{ (mm)}]/A \text{ (mm)}\} \times 100 \quad \text{Formula (1)}$$

The evaluation standard of the coating property is as below.

⊚: horizontal fluidity of 13 to 30%

○: horizontal fluidity of 7% or higher but lower than 13%

Δ: horizontal fluidity of 5% or higher but lower than 7% x: horizontal fluidity of lower than 5%

(Evaluation of Uniformity of Coating Film)

The edge covering property explained below was determined by visual observation to evaluate uniformity of the coating film.

Each of the epoxy resin powder coating materials of examples and comparative examples was applied to a 4 mm-square bar so as to have a film thickness of 0.5 to 1.0 mm, cured at 190° C. for 20 minutes and a cured coating film was obtained.

The evaluation standard of the coating film uniformity was as below.

○: no dripping on the cured coating film (excellent)

Δ: dripping arose on the cured coating film, but when preheated (for example, at 150° C. for 20 minutes) before curing under the same condition, no dripping arose on the cured coating film (good)

x: dripping arose on the cured coating film when preheated and cured under the same condition as in Δ above (defective)

(Evaluation of Heat Cycle Resistance)

Each of the epoxy resin powder coating materials in examples and comparative examples was applied to an iron bolt (M12) to have a film thickness of 0.5 to 1.0 mm, then, cured under the curing condition of 190'C for 20 minutes. The iron bolt (M12) will be referred to as a test piece below.

Next, the test piece was placed in a vapor-phase cold chamber, left for 30 minutes at −40° C. then 30 minutes at 150° C. This treatment was considered as one cycle and a heat cycle test of repeating the cycle for a plurality of times was conducted. A crack arising state at a constricted part of the test piece was observed visually.

Note that three test pieces were used and the evaluation was made on an average value of the numbers of cycles before a crack arose.

The evaluation standard of the heat cycle resistance was as below.

⊚: no crack observed even at 100 cycles or more (very excellent)

○: no crack observed at 80 to 99 cycles (excellent)

Δ: no crack observed at 50 to 79 cycles (good)

x: cracks arose at less than 50 cycles (defective)

Example 1

At the weight ratio shown in Table 1, (A1) a bisphenol A-type type epoxy resin (jER1002, molecular weight: 1200, made by Mitsubishi Chemical Corporation) (A2) a bisphenol A-type type epoxy resin (jER1004, molecular weight: 1650, made by Mitsubishi Chemical corporation), an acid anhydride as a curing agent (BTDA made by PTI Japan Corporation), dicyandiamide as a curing catalyst (jER DICY20 made by Mitsubishi Chemical Corporation), (B1) spherical molten silica (SC30, average particle diameter: 30 μm made by Micron Company) and (C1) acryl-based core shell type particle (containing a glycidyl group, Paraloid EXL-2314, average particle diameter: 0.3 μm, made by Dow Chemical Company) were blended and subjected to melt kneading at 110 to 130° C. by using an extruder. The kneading time here was 30 seconds or shorter. After cooling the mixture to cure, it was finely pulverized and a powder coating material was obtained. The powder coating material was applied to test pieces by the fluid-soaking method. The coating time was 2 seconds for two times. Then, the obtained coating film was cured at 190'C for 20 minutes and a cured coating film was obtained.

The results of evaluating the coating property, uniformity and heat cycle resistance of coating films by the methods explained above are shown in Table 1.

Comparative Example 1

Other than using (B2) spherical molten silica having an average particle diameter of 5 μm as a substitute for (B1), a powder coating material was obtained in the same way as in the example 1.

Comparative Example 2

Other than using (B3) spherical molten silica having an average particle diameter of 75 μm as a substitute for (B1), a powder coating material was obtained in the same way as in the example 1.

Comparative Example 3

Other than not blending (C1), a powder coating material was obtained in the same way as in the example 1.

Comparative Example 4

Other than changing a blending amount of (C1) to 20 parts by weight and not blending (B1), a powder coating material was obtained in the same way as in the example 1.

Comparative Example 5

Other than using (C2) acryl-based non-core shell type particle (average particle diameter: 0.3 μm) as a substitute for (C1), a powder coating material was obtained in the same way as in the example 1.

The powder coating materials in the comparative examples 1 to 5 above were evaluated in the same way as in the example 1. The evaluation results are shown in Table 1.

TABLE 1

|  | Example 1 | Comparative Example 1 | Comparative Example 2 | Comparative Example 3 | Comparative Example 4 | Comparative Example 5 |
|---|---|---|---|---|---|---|
| (A1) Bisphenol A-type Epoxy Resin (Molecular Weight: 1200) | 80 | 80 | 80 | 80 | 80 | 80 |
| (A2) Bisphenol A-type Epoxy Resin (Molecular Weight: 1650) | 20 | 20 | 20 | 20 | 20 | 20 |
| Acid Anhydride | 24.8 | 24.8 | 24.8 | 24.8 | 24.8 | 24.8 |
| Dicyandiamide | 0.2 | 0.2 | 0.2 | 0.2 | 0.2 | 0.2 |
| (B1) Spherical Molten Silica (30 μm) | 200 | — | — | 200 | — | 200 |
| (B2) Spherical Molten Silica (5 μm) | — | 200 | — | — | — | — |
| (B3) Spherical Molten Silica (75 μm) | — | — | 200 | — | — | — |
| (C1) Acryl-based Core Shell Particle (0.3 μm) | 9 | 9 | 9 | — | 20 | — |
| (C2) Acryl-based Non Core Shell Particle (0.3 μm) | — | — | — | — | — | 9 |
| Coating Property | ◎ | X | ◎ | ◎ | ○ | ◎ |
| Uniformity of Coating Film | ○ | ○ | X | X | ○ | ○ |
| Heat Cycle Resistance | ◎ | ○ | X | X | X | X |

(Consideration 1)

As shown in Table 1, from the example 1 and comparative examples 1 and 2, by using both of a spherical inorganic particle having an average particle diameter of 16 to 50 μm and an acryl-based core shell type particle having an average particle diameter of 0.1 to 0.4 μm, an epoxy resin powder coating material capable of forming coating films having an excellent coating property, uniformity and heat cycle resistance can be obtained.

Also, from the example 1 and comparative examples 3 and 4, by using both of a spherical inorganic particle and acryl-based core shell type particle, an obtained coating films exhibits excellent heat cycle resistance.

From the example 1 and comparative example 5, by using an acryl-based core shell type particle, an epoxy resin powder coating material capable of forming a coating film having excellent heat cycle resistance can be obtained.

Examples 2a to 2e

Other than changing the blending amount of (B1) to those shown in Table 2, powder coating materials were obtained in the same way as in the example 1, and evaluations were made in the same way as in the example 1. The evaluation results are shown in Table 2.

For easier comparison, Table 2 also shows the evaluations on the example 1.

TABLE 2

|  | Example 2a | Example 2b | Example 1 | Example 2c | Example 2d | Example 2e |
|---|---|---|---|---|---|---|
| (A1) Bisphenol A-type Epoxy Resin (Molecular Weight: 1200) | 80 | 80 | 80 | 80 | 80 | 80 |
| (A2) Bisphenol A-type Epoxy Resin (Molecular Weight: 1650) | 20 | 20 | 20 | 20 | 20 | 20 |
| Acid Anhydride | 24.8 | 24.8 | 24.8 | 24.8 | 24.8 | 24.8 |
| Dicyandiamide | 0.2 | 0.2 | 0.2 | 0.2 | 0.2 | 0.2 |
| (B1) Spherical Molten Silica (30 μm) | 150 | 180 | 200 | 230 | 250 | 270 |
| (C1) Acryl-based Core Shell Particle (0.3 μm) | 9 | 9 | 9 | 9 | 9 | 9 |
| (C3) Acryl-based Core Shell Particle (0.1 μm) | — | — | — | — | — | — |
| (C4) Acryl-based Core Shell Particle (1 μm) | — | — | — | — | — | — |
| Coating Property | ◎ | ◎ | ◎ | ○ | ○ | Δ |
| Uniformity of Coating Film | Δ | ○ | ○ | ○ | ○ | ○ |
| Heat Cycle Resistance | Δ | ○ | ◎ | ◎ | ◎ | ◎ |

(Consideration 2)

As shown in Table 2, the examples 2b, 2c and 2d exhibited almost same results as those in the example 1. The example 2a exhibited the same result on the coating property as that in the example 1 and slightly poorer results on uniformity and heat cycle resistance of the coating film, however, there was no problem in practical use. In the example 2e, results on the uniformity and heat cycle resistance were the same as those in the example 1 and the coating property was slightly poorer than that in the example 1, however, there was no problem in terms of practical use.

From the above, it is understood that, particularly when a spherical inorganic particle is in a range of 180 to 250 parts by weight, a coating film having excellent uniformity and heat cycle resistance can be obtained without deteriorating the coating property.

Examples 3a to 3e

Other than changing the blending amount of (C1) to those shown in Table 3, powder coating materials were obtained in the same way as in the example 1 and evaluations were made in the same way as in the example 1. The evaluation results are shown in Table 3.

For easier comparison, Table 3 also shows the evaluation on the example 1, as well.

TABLE 3

|  | Example 3a | Example 3b | Example 3c | Example 1 | Example 3d | Example 3e |
|---|---|---|---|---|---|---|
| (A1) Bisphenol A-type Epoxy Resin (Molecular Weight: 1200) | 80 | 80 | 80 | 80 | 80 | 80 |
| (A2) Bisphenol A-type Epoxy Resin (Molecular Weight: 1650) | 20 | 20 | 20 | 20 | 20 | 20 |
| Acid Anhydride | 24.8 | 24.8 | 24.8 | 24.8 | 24.8 | 24.8 |
| Dicyandiamide | 0.2 | 0.2 | 0.2 | 0.2 | 0.2 | 0.2 |
| (B1) Spherical Molten Silica (30 μm) | 200 | 200 | 200 | 200 | 200 | 200 |
| (C1) Acryl-based Core Shell Particle (0.3 μm) | 1 | 3 | 6 | 9 | 20 | 25 |
| (C3) Acryl-based Core Shell Particle (0.1 μm) | — | — | — | — | — | — |
| (C4) Acryl-based Core Shell Particle (1 μm) | — | — | — | — | — | — |
| Coating Property | ◎ | ◎ | ◎ | ◎ | Δ | Δ |
| Uniformity of Coating Film | ○ | ○ | ○ | ○ | ○ | ○ |
| Heat Cycle Resistance | Δ | ○ | ◎ | ◎ | ◎ | ◎ |

(Consideration 3)

As shown in Table 3, the examples 3b and 3c exhibited almost the same results as those in the example 1. In the example 3a, the coating property and uniformity of a coating film were the same as those in the example 1 and, as to the heat cycle resistance, the number of cycle repetition was slightly less than that in the example 1, however, there was no problem in terms of practical use. The examples 3d and 3e exhibited the same results on the uniformity and heat cycle resistance of coating films as those in the example 1 and the results on the coating property were slightly poorer than that in the example 1, however, there was no problem in terms of practical use.

From the above, it is understood that particularly when an acryl-based core shell type particles (0.3 μm) is in a range of 3 to 25 parts by weight, a uniform coating film having excellent heat cycle resistance can be obtained without deteriorating the coating property.

Example 4a

Other than using (C3) an acryl-based core shell type particle (average particle diameter 0.1 μm) as a substitute for (C1), a powder coating material was obtained in the same way as in the example 1 and the same evaluations were made. The evaluation results are shown in Table 4.

Example 4b

Other than using (C4) an acryl-based core shell type particle (average particle diameter 1 μm) as a substitute for (C1), a powder coating material was obtained in the same way as in the example 1 and the same evaluations were made. The evaluation results are shown in Table 4.

For easier comparison, Table 4 also shows the evaluations on the example 1, as well.

TABLE 4

|  | Examlpe 1 | Example 4b | Example 4b |
|---|---|---|---|
| (A1) Bisphenol A-type Epoxy Resin (Molecular Weight: 1200) | 80 | 80 | 80 |
| (A2) Bisphenol A-type Epoxy Resin (Molecular Weight: 1650) | 20 | 20 | 20 |

TABLE 4-continued

|  | Examlpe 1 | Example 4b | Example 4b |
|---|---|---|---|
| Acid Anhydride | 24.8 | 24.8 | 24.8 |
| Dicyandiamide | 0.2 | 0.2 | 0.2 |
| (B1) Spherical Molten Silica (30 μm) | 200 | 200 | 200 |
| (C1) Acryl-based Core Shell Particle (0.3 μm) | 9 | — | — |
| (C3) Acryl-based Core Shell Particle (0.1 μm) | — | 9 | — |
| (C4) Acryl-based Core Shell Particle (1 μm) | — | — | 9 |
| Coating Property | ◎ | ◎ | ◎ |
| Uniformity of Coating Film | ○ | ○ | ○ |
| Heat Cycle Resistance | ◎ | ◎ | Δ |

(Consideration 4)

As shown in Table 4, the same results as those in the example 1 were obtained in the example 4a. The example 4b exhibited the same coating property and uniformity of the coating film as those in the example 1 and, as to the heat cycle resistance, the number of cycle repetition was slightly less than that in the example 1, however, there was no problem in terms of practical use.

From the above, it is understood that particularly when an average particle diameter of an acryl-based core shell type particle is in a range of 0.1 to 0.4 μm, a coating film having an excellent coating property, uniformity and heat cycle resistance can be obtained.

What is claimed is:

1. An epoxy resin powder coating material, comprising (A) bisphenol A-type epoxy resin, (B) spherical inorganic particle having an average particle diameter (d1) of 25 to 50 μm, and (C) acryl-based core shell type particle as essential components;
   wherein the (B) has a linear expansion coefficient of $1 \times 10^{-6}$ (/° C.) or less in a range of −50° C. to 250° C.; and
   wherein the (C) includes:
   a) a core particle formed with a butyl acrylate polymer, and an outermost layer of the shell formed with methyl methacrylate/glycidyl methacrylate copolymer, or
   b) a core particle formed with a dimethylsiloxane/butyl acrylate copolymer, and an outermost layer of the shell formed with methyl methacrylate/glycidyl methacrylate copolymer.

2. The epoxy resin powder coating material according to claim 1, wherein an average particle diameter (d2) of the (C) is 0.1 to 0.4 μm.

3. The epoxy resin powder coating material according to claim 2, wherein a ratio (d2/d1) of the (d2) to the (d1) is 0.002 to 0.025.

4. The epoxy resin powder coating material according to claim 3, wherein a blending amount of the (B) is 180 to 250 parts by weight with respect to 100 parts by weight of component (A).

5. The epoxy resin powder coating material according to claim 3, wherein a blending amount of the (C) is 3 to 25 parts by weight with respect to 100 parts by weight of component (A).

6. A cured coating film, formed from the powder coating material according to claim 3 and a curing agent,
   on which cracks do not arise when repeating a heat cycle test for 80 cycles, one cycle is a treatment of leaving the cured product for 30 minutes at −40° C. and then for 30 minutes at 150° C.

7. The epoxy resin powder coating material according to claim 2, wherein a blending amount of the (B) is 180 to 250 parts by weight with respect to 100 parts by weight of component (A).

8. The epoxy resin powder coating material according to claim 2, wherein a blending amount of the (C) is 3 to 25 parts by weight with respect to 100 parts by weight of component (A).

9. A cured coating film, formed from the powder coating material according to claim 2 and a curing agent,
   on which cracks do not arise when repeating a heat cycle test for 80 cycles, one cycle is a treatment of leaving the cured product for 30 minutes at −40° C. and then for 30 minutes at 150° C.

10. The epoxy resin powder coating material according to claim 1, wherein a blending amount of the (B) is 180 to 250 parts by weight with respect to 100 parts by weight of component (A).

11. The epoxy resin powder coating material according to claim 1, wherein a blending amount of the (C) is 3 to 25 parts by weight with respect to 100 parts by weight of component (A).

12. A cured coating film, formed from the powder coating material according to claim 1 and a curing agent,
    on which cracks do not arise when repeating a heat cycle test for 80 cycles, one cycle is a treatment of leaving the cured product for 30 minutes at −40° C. and then for 30 minutes at 150° C.

13. The epoxy resin powder coating material according to claim 1, wherein the core comprises 60-90 wt % of the (C) acryl-based core shell type particle.

* * * * *